United States Patent
Yuan et al.

(10) Patent No.: US 8,937,826 B2
(45) Date of Patent: Jan. 20, 2015

(54) POWER CONVERTER APPARATUS

(71) Applicant: Delta Electronics, Inc., Taoyuan Hsien (TW)

(72) Inventors: Te-Wei Yuan, Taoyuan Hsien (TW); Yi-Kai Chou, Taoyuan Hsien (TW); Chien-Yu Tseng, Taoyuan Hsien (TW); Yu-Jen Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 2 days.

(21) Appl. No.: 13/665,089

(22) Filed: Oct. 31, 2012

(65) Prior Publication Data

US 2013/0300381 A1 Nov. 14, 2013

(30) Foreign Application Priority Data

May 11, 2012 (TW) .............................. 101116749 A

(51) Int. Cl.
*H02M 5/42* (2006.01)
*G05F 1/70* (2006.01)
*H02J 3/01* (2006.01)

(52) U.S. Cl.
CPC ... *G05F 1/70* (2013.01); *H02J 3/01* (2013.01); Y02B 70/123 (2013.01)
USPC .......................................................... 363/89

(58) Field of Classification Search
USPC ......... 363/78, 84, 89, 125, 127; 323/205, 207
See application file for complete search history.

(56) References Cited

U.S. PATENT DOCUMENTS

| | | | | |
|---|---|---|---|---|
| 4,914,337 A | * | 4/1990 | Takagi | 310/316.02 |
| 4,974,141 A | * | 11/1990 | Severinsky et al. | 363/81 |
| 7,315,150 B1 | * | 1/2008 | Coleman | 323/222 |
| 7,382,112 B2 | * | 6/2008 | Krein | 323/207 |
| 2002/0121882 A1 | * | 9/2002 | Matsuo et al. | 323/266 |
| 2004/0136208 A1 | * | 7/2004 | Agarwal et al. | 363/21.12 |
| 2008/0130336 A1 | * | 6/2008 | Taguchi | 363/125 |
| 2008/0157727 A1 | * | 7/2008 | Wong et al. | 323/207 |
| 2009/0213513 A1 | | 8/2009 | Baudesson | |

(Continued)

FOREIGN PATENT DOCUMENTS

| | | |
|---|---|---|
| CN | 86105273 A | 3/1988 |
| CN | 1179645 A | 4/1998 |

(Continued)

*Primary Examiner* — Adolf Berhane
*Assistant Examiner* — Monica Mata
(74) *Attorney, Agent, or Firm* — CKC & Partners Co., Ltd.

(57) ABSTRACT

A power converter apparatus for driving an electronic load is disclosed. The power converter apparatus includes a rectifier module, an active switch unit, a driving module, an input voltage detection module, an output voltage detection module, a current detection module and a digital processor module. The active switch unit is shunt connected to the electronic load. The input voltage detection module is used for sampling out an input sampled voltage waveform. The output voltage detection module is used for sampling out an output sampled voltage waveform. The current detection module is used for sampling out a practical input current waveform. The digital processor module generates a current reference command according to the input sampled voltage waveform and the output sampled voltage waveform. The digital processor module dynamically switches the active switch unit according to the current reference command and the practical input current waveform.

19 Claims, 7 Drawing Sheets

(56) References Cited

U.S. PATENT DOCUMENTS

2011/0026284 A1* 2/2011 Sutardja et al. ............... 363/126
2013/0088903 A1* 4/2013 Sagona et al. ................ 363/125
2013/0342139 A1* 12/2013 Shimomugi et al. ....... 318/400.3

FOREIGN PATENT DOCUMENTS

| | | |
|---|---|---|
| CN | 1219798 A | 6/1999 |
| CN | 1233104 A | 10/1999 |

* cited by examiner

POWER CONVERTER APPARATUS

RELATED APPLICATIONS

This application claims priority to Taiwan Application Serial Number 101116749, filed May 11, 2012, which is herein incorporated by reference.

BACKGROUND

1. Technical Field

The present disclosure relates to a power converter apparatus. More particularly, the present disclosure relates to a power converter apparatus with the function of power factor correction.

2. Description of Related Art

Due to the energy crisis in recent years, many countries focus on developing new energy and set up high environmental standard to regulate the specifications of the electronic products, especially to the power factor and total harmonic distortion of the electronic products. For example, some new electricity regulations (e.g., the specification IEC 61000-3-12) have requirements in the total harmonic distortion, and these regulations will affect the designers in product design considerations.

In general, electrical equipments are usually not purely resistive. Non-resistivity of the electrical equipments (whether the electrical equipments are inductive or capacitive) will lead to a poor power factor, which will result in an increased input current and a heavy load on the power supply system. In addition, the serious distortions occurred on the input current may includes a high degree of the harmonic waveform components, which may cause a serious pollution to the power grid network.

Therefore, the quality of the power supply system will be highly elevated if the power factor of the electrical equipment can be improved and the harmonic distortion can be reduced. The traditional power factor improvement circuits involve two major categories of passive-type power factor improvement circuits and active-type power factor improvement circuits. The passive power factor improvement circuits utilize passive components (such as inductors, capacitors) to improve the power factor. The passive-type power factor improvement circuits have advantages of their simply construction. However, the passive-type power factor improvement circuits have disadvantages of huge sizes and limited abilities in power factor correction.

On the other hand, the active-type power factor improvement circuits utilize additional circuitry to achieve the purpose of power factor correction. The active-type power factor improvement circuits have smaller sizes, lighter weights, and higher power factors compared to the passive-type power factor improvement circuits. However, the traditional active-type power factor improvement circuits involve complex external circuits, and the traditional active-type power factor improvement circuits must be re-calibrated or re-modeled in order to match different ratios of harmonic waveform components.

SUMMARY

In order to solve the problems in the art, the disclosure provides a circuitry structure of a power converter apparatus for calibrating a power factor and improving harmonic waveform components of an input current, so as to match a modern electricity regulation. A rectified input voltage waveform is converted by a controller for generating a current reference command in a traditional method, but this traditional method is ineffective in reducing the harmonic waveforms of the input current signal. In the present invention, the input voltage waveform obtained by the input voltage detection module is transmitted to a digital processor module for frequency adjustment, so as to generate a reference voltage waveform. After all, one goal condition of the present disclosure is to make sure the realistic input current follows reference voltage waveform. Corresponding to the goal condition, the power converter apparatus generates a switch signal controlling the active switch unit, so as to improve the power factor and reduce the harmonic waveform components of the power converter apparatus.

An aspect of the invention is to provide a power converter apparatus coupled to an electronic load and configured for driving the electronic load. The power converter apparatus includes a rectifier module, an active switch unit, an input voltage detection module, an output voltage detection module, a current detection module and a digital processor module. The rectifier module is coupled to an alternating-current power input. The active switch unit is coupled between the rectifier module and the electronic load. Two terminals of the active switch unit are shunt connected to two terminals of the electronic load. The input voltage detection module is coupled between the rectifier module and the active switch unit for sampling out a sampled input voltage waveform. The output voltage detection module is coupled between the active switch unit and the electronic load for sampling out a sampled output voltage waveform. The current detection module is coupled to the active switch unit for sampling out a realistic input current waveform. The digital processor module is coupled to the input voltage detection module, the output voltage detection module, the current detection module and a controlling terminal of the active switch unit. The digital processor module generates a current reference command according to the sampled input voltage waveform and the sampled output voltage waveform. The digital processor module dynamically switches the active switch unit according to the current reference command and the practical input current waveform.

According to an embodiment of the invention, the active switch unit is a silicon carbide switch.

According to an embodiment of the invention, the digital processor module includes a reference voltage waveform generator, an output voltage feedback modulator and a current reference command generator. The reference voltage waveform generator is coupled to the input voltage detection module for processing the sampled input voltage waveform and accordingly generating a reference voltage waveform. The output voltage feedback modulator is coupled to the output voltage detection module for generating a control signal according to the sampled output voltage waveform. The current reference command generator is coupled to the reference voltage waveform generator and the output voltage feedback module. The current reference command generator is configured for generating the current reference command according to the reference voltage waveform and the control signal.

According to an embodiment of the invention, the reference voltage waveform generated by the reference voltage waveform generator determines a current pulse width of the current reference command.

According to an embodiment of the invention, the control signal generated by the output voltage feedback modulator determines a current amplitude of the current reference command.

According to an embodiment of the invention, a frequency of the reference voltage waveform lower than a frequency of the sampled input voltage waveform.

According to an embodiment of the invention, the digital processor module further includes a driving module, a current feedback modulator and a switch signal generator. The driving module is coupled to the controlling terminal of the active switch unit. The current feedback modulator is coupled to the current detection module and the current reference command generator. The current feedback modulator adjusts the current reference command according to the realistic input current waveform sampled by the current detection module, so as to generate a switch modulation signal. The switch signal generator is coupled to the current feedback modulator. The switch signal generator generates a switch signal to the driving module according to the switch modulation signal, so as to switch the active switch unit.

According to an embodiment of the invention, the current feedback modulator continuously adjusts the current reference command for controlling the active switch unit until the realistic input current waveform follows (or aligns to) the reference voltage waveform.

According to an embodiment of the invention, the power converter apparatus further includes a capacitor unit and an inductor unit. The capacitor unit is shunt connected to the electronic load, and the inductor unit is connected in series with the electronic load.

According to an embodiment of the invention, the power converter apparatus further includes a passive switch unit connected in series between the inductor unit and the electronic load.

According to an embodiment of the invention, the power converter apparatus further includes another active switch unit connected in series between the inductor unit and the electronic load.

According to an embodiment of the invention, the alternating-current power input is a three-phased alternating-current power input.

Another aspect of the invention is to provide a power converter apparatus coupled to an electronic load and configured for driving the electronic load. The power converter apparatus includes a rectifier module, an active switch unit, a state detection module and a digital processor module. The rectifier module is coupled to an alternating-current power input. The active switch unit is coupled between the rectifier module and the electronic load. Two terminals of the active switch unit are shunt connected to the electronic load. The state detection module is coupled between the rectifier module and the electronic load for detecting states of the power converter apparatus. The state detection module correspondingly generates a sampled input voltage waveform, a sampled output voltage waveform and a realistic input current waveform. The digital processor module receives the sampled input voltage waveform, the sampled output voltage waveform and the realistic input current waveform. After the digital processor module generates a reference voltage waveform according to the sampled input voltage waveform, the digital processor module generates a current reference command so as to control the active switch unit until the realistic input current waveform follows the reference voltage waveform.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

Figure 1:
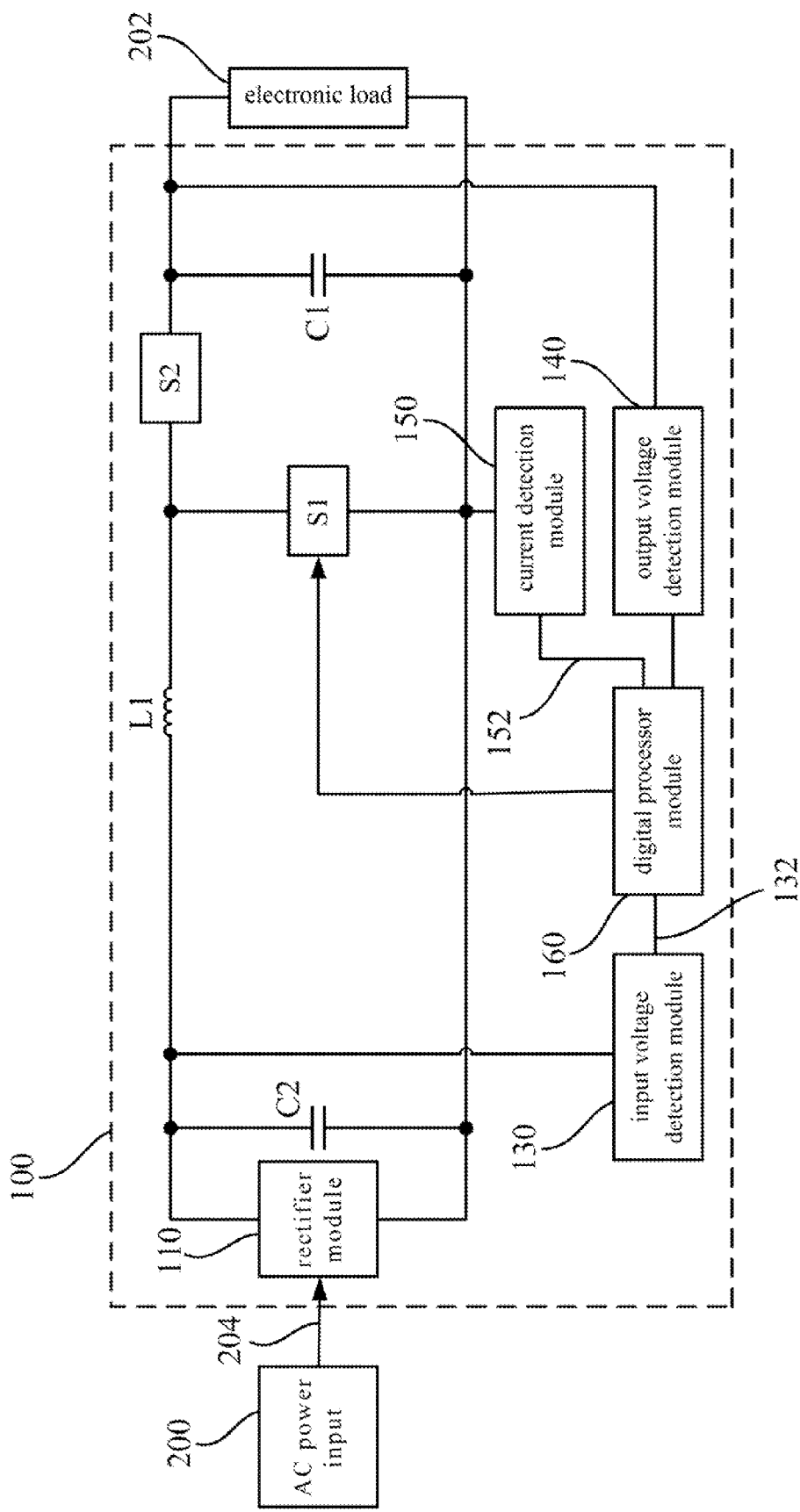
FIG. 1 is a schematic diagram illustrating a power converter apparatus according to a preferable embodiment of the invention.

Reference is made to FIG. 1, which is a schematic diagram illustrating a power converter apparatus 100 according to a preferable embodiment of the invention. The power converter apparatus 100 receives an alternating-current power input 200 for driving an electronic load 202. In the preferable embodiment, the alternating-current power input 200 is a three-phased alternating-current power input.

As shown in FIG. 1, the power converter apparatus 100 includes a rectifier module 110, an active switch unit S1, an input voltage detection module 130, an output voltage detection module 140, a current detection module 150 and a digital processor module 160.

The rectifier module 110 is coupled to the alternating-current power input 200. The active switch unit S1 is coupled between the rectifier module 110 and the electronic load 202. In addition, two terminals of the active switch unit S1 are shunt connected (parallel connected) to two terminals of the electronic load 202. In this embodiment, the active switch unit S1 can be a silicon carbide switch, but the invention is not limited thereto.

The digital processor module 160 is coupled to a controlling terminal (e.g., the gate electrode) of the active switch unit S1, for controlling conductive states (including a conducted mode and a disconnected mode) of the active switch unit S1. In this preferable embodiment, the power converter apparatus 100 further includes a capacitor unit C1 and an inductor unit L1. The capacitor unit C1 is shunt connected to the electronic load 202. The inductor unit L1 is connected in series with the electronic load 202. When the digital processor module 160 switches the active switch unit S1 into the disconnected mode, the capacitor unit C1 and the inductor unit L1 may form a traditional LC filter circuit with a fixed filtering constant. When the digital processor module 160 switches the active switch unit S1 into the conducted mode, the operational behaviors of the LC filter circuit are adjusted dynamically, so as to achieve the calibrating function of the power factor.

In addition, the power converter apparatus 100 in practical applications may further include another capacitor C2 coupled at the input stage for high-frequency filtering.

The alternating-current power input 200 may provide a three-phased alternating-current power signal 204 to the power converter apparatus 100. The rectifier module 110 is configured for rectifying the power signal 204 provided by the alternating-current power input 200.

The input voltage detection module 130 is coupled between the rectifier module 110 and the active switch unit S1. The input voltage detection module 130 samples the rectified power signal and accordingly generates a waveform of sampled input voltage 132. The output voltage detection module 140 is coupled between the active switch unit S1 and the electronic load 202 for sampling out a waveform of sampled output voltage. The current detection module 150 is coupled to the active switch unit S1 for sampling out a waveform of realistic input current 152.

Figure 2:
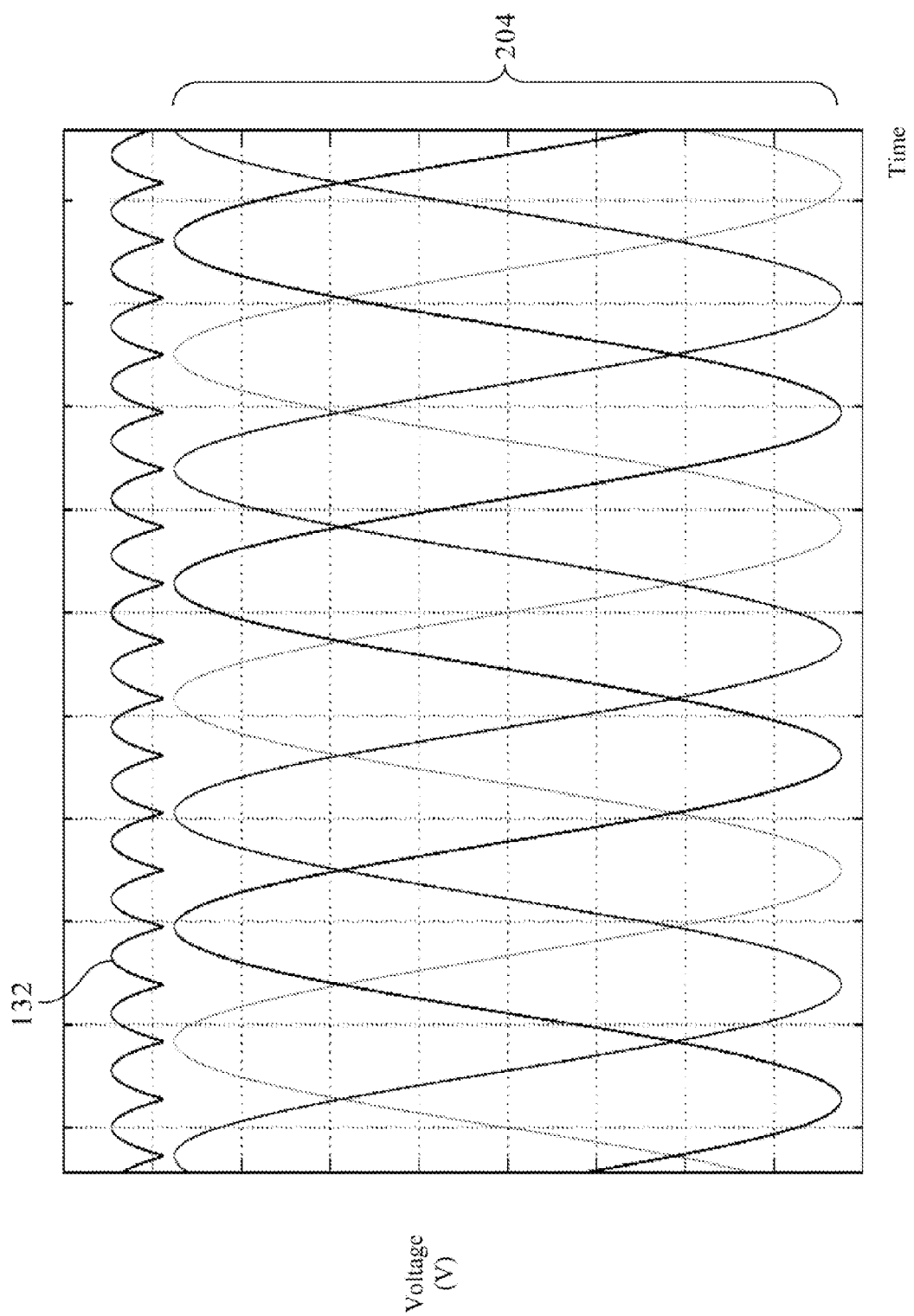
FIG. 2 is a schematic diagram illustrating a waveform of sampled input voltage generated by the input voltage detection module.

Reference is made to FIG. 2, which is a schematic diagram illustrating the waveform of sampled input voltage 132 generated by the input voltage detection module and the three-phased voltage waveform of the power signal 204 provided by the alternating-current power input 200.

As shown in FIG. 2, after rectifying the alternating-current power signal by the rectifier module 110, the waveform of sampled input voltage 132 generated by the input voltage detection module is a high-frequency waveform of sampled input voltage 132. In the preferable embodiment, the waveform of sampled input voltage 132 is transmitted to the digital processor module 160 for further processing. The details of processing procedures are explained in following paragraphs.

Figure 3:
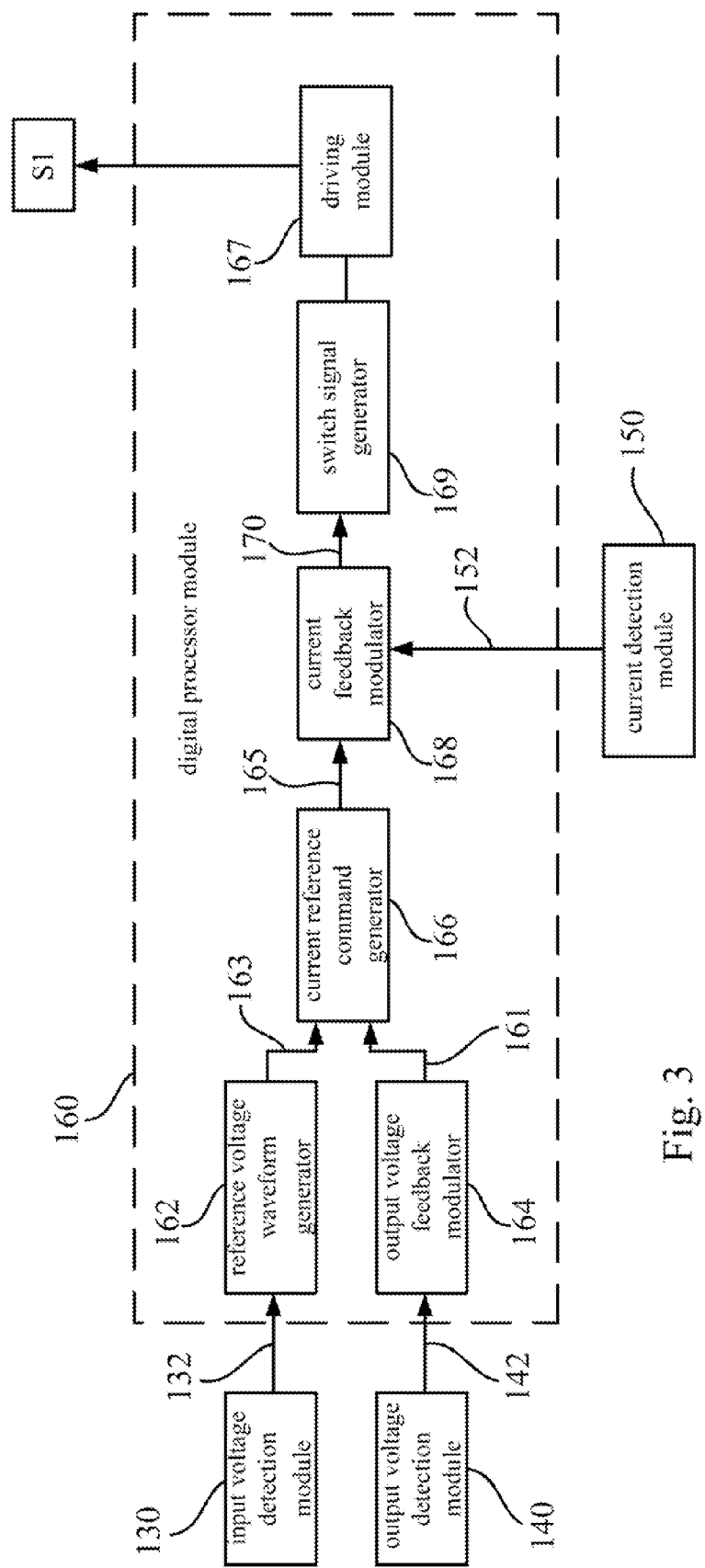
FIG. 3 is a schematic diagram illustrating a digital processor module according to a preferable embodiment of the invention.

The digital processor module 160 is coupled to the input voltage detection module 130, the output voltage detection module 140 and the current detection module 150. Reference is also made to FIG. 3, which is a schematic diagram illustrating the digital processor module 160 according to a preferable embodiment of the invention.

As shown in FIG. 3, the digital processor module 160 includes a reference voltage waveform generator 162, an output voltage feedback modulator 164 and a current reference command generator 166, a driving module 167, a current feedback modulator 168 and a switch signal generator 169.

The driving module 167 is coupled to the controlling terminal (e.g., the gate electrode) of the active switch unit S1, for controlling the conductive states (including the conducted mode and the disconnected mode) of the active switch unit S1. The digital processor module 160 switches the active switch unit S1 through the driving module 167.

The reference voltage waveform generator 162 is coupled to the input voltage detection module 130. The output voltage feedback modulator 164 is coupled to the output voltage detection module 140. The reference voltage waveform generator 162, the output voltage feedback modulator 164 and the current reference command generator 166, the current feedback modulator 168 and the switch signal generator 169 can be packed in one processor, and the formation of processor is well known by a person in the art, so the detail circuits are not to be further mentioned here.

Figure 4:
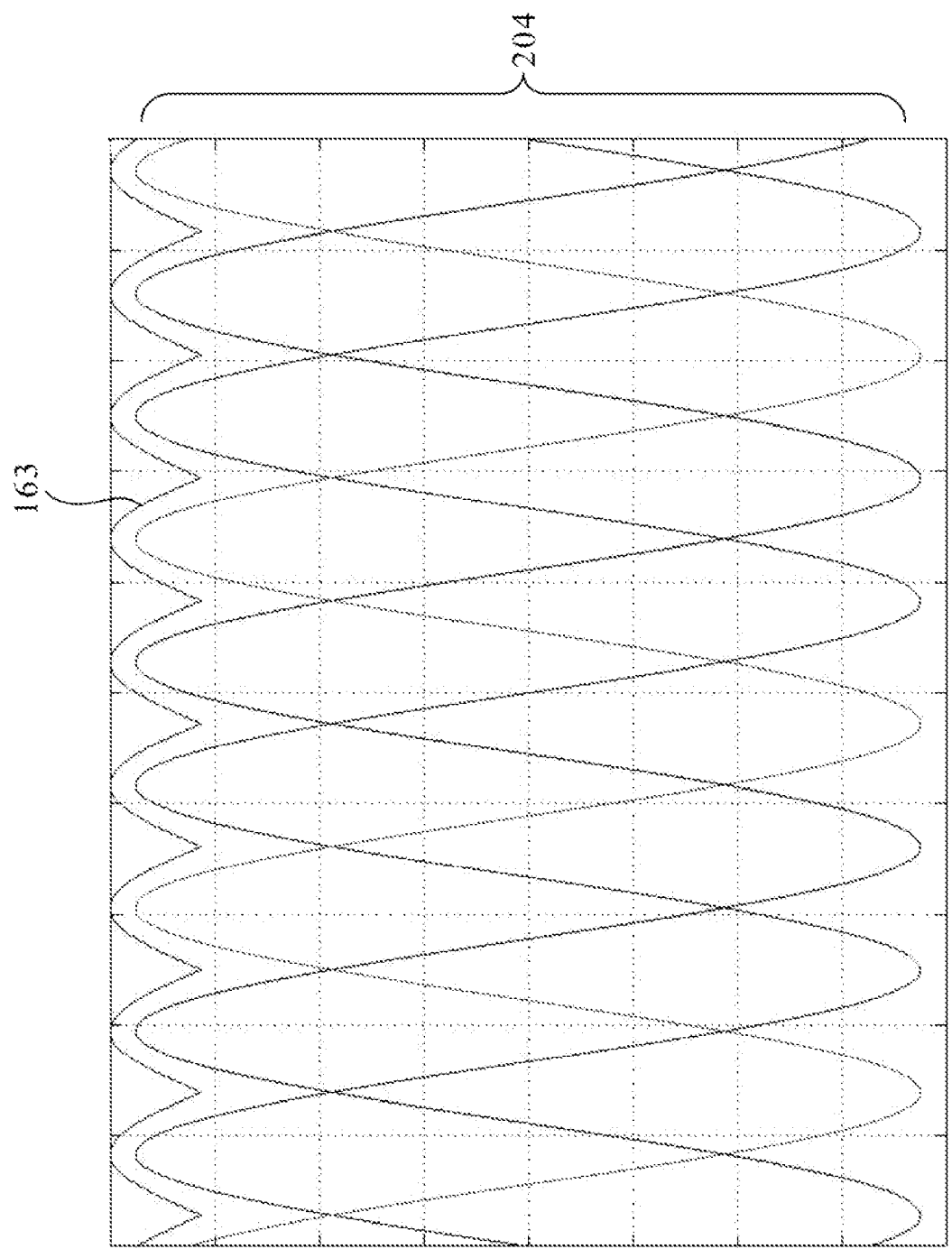
FIG. 4 is a schematic diagram illustrating a reference voltage waveform generated by a reference voltage waveform generator.

The reference voltage waveform generator 162 is configured for processing the waveform of sampled input voltage 132 from the input voltage detection module 130 and accordingly generating a reference voltage waveform 163. Reference is made to FIG. 4, which is a schematic diagram illustrating the reference voltage waveform 163 generated by the reference voltage waveform generator 162. A frequency of the reference voltage waveform 163 generated by the reference voltage waveform generator 162 is lower than a frequency of the waveform of the input sampled voltage 132. As shown in FIG. 4, the frequency of the reference voltage waveform 163 is half as the frequency of the waveform of the input sampled voltage 132, but the invention is not limited thereto.

In general, the frequency of the waveform of sampled input voltage 132 is higher than the frequency of the current waveform. The frequency of the reference voltage waveform 163 generated by the reference voltage waveform generator 162 is designed to approach the varying frequency of the three-phased voltage waveform of the power signal 204, in order to facilitate follow-up of the power factor adjustment.

Figure 5:
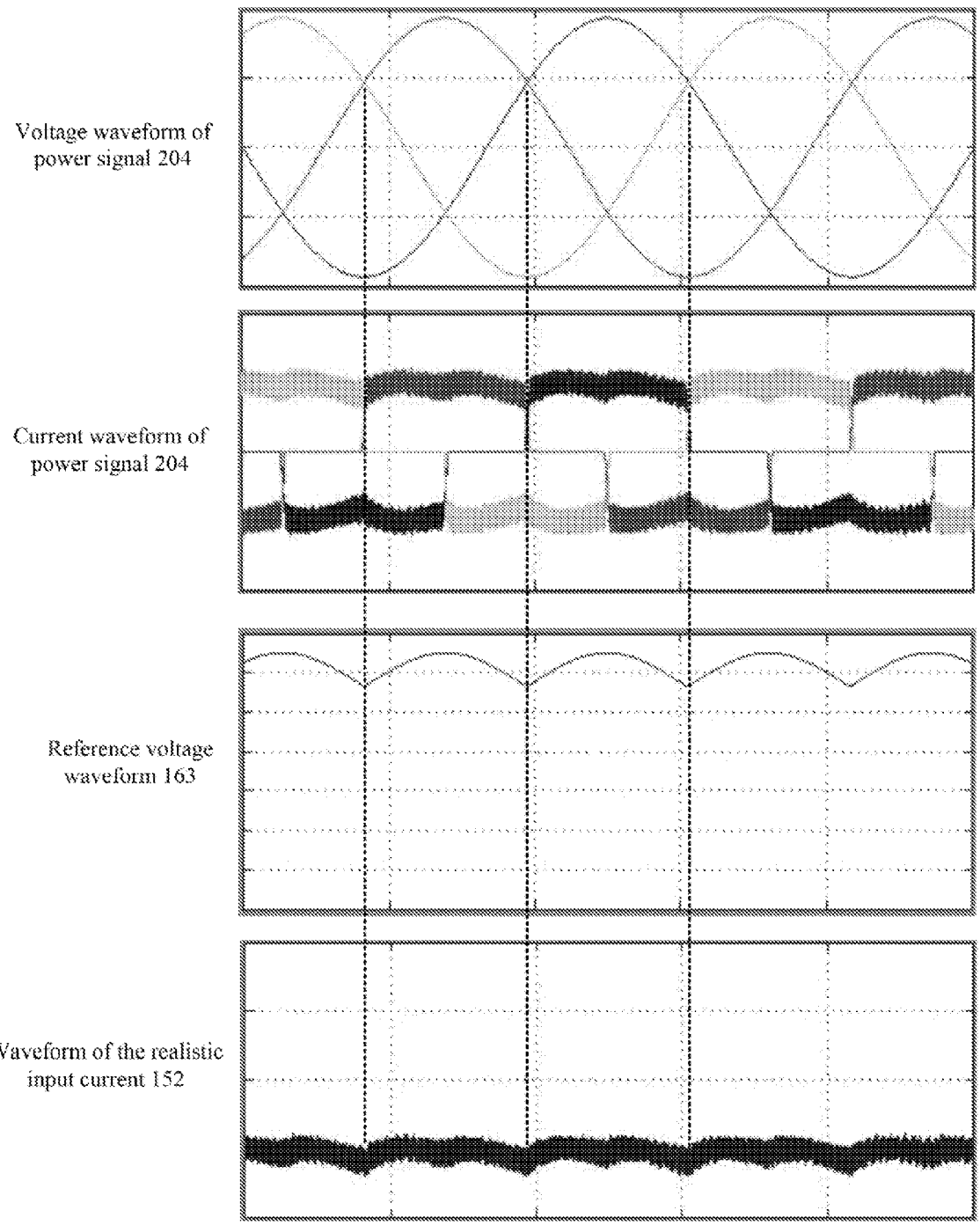
FIG. 5 is a schematic diagram illustrating the relationship between a waveform of the realistic input current sampled by a current detection module, a voltage waveform of a power signal, a current waveform of the power signal and the reference voltage waveform.

Reference is made to FIG. 5, which is a schematic diagram illustrating the relationship between the waveform of the realistic input current 152 sampled by the current detection module 150, the voltage waveform of the power signal 204, the current waveform of the power signal 204 and the reference voltage waveform 163.

The current reference command generator 166 is coupled to the reference voltage waveform generator 162 and the output voltage feedback modulator 164. The output voltage feedback modulator 164 is coupled to the output voltage detection module 140 for generating a control signal 161 according to the waveform of sampled output voltage 142.

The current reference command generator 166 is configured for generating the current reference command 165 according to the product of the reference voltage waveform 163 (from the reference voltage waveform generator 162) and the control signal 161 (from the output voltage feedback modulator 164).

The reference voltage waveform 163 generated by the reference voltage waveform generator 162 determines a current pulse width of the current reference command 165. In addition, the reference voltage waveform generator 162 is configured for processing the waveform of sampled input voltage 132, and reducing the frequency of the waveform of sampled input voltage 132. The control signal 161 generated by the output voltage feedback modulator 164 determines a current amplitude of the current reference command 165. The usage of the current reference command 165 is to made sure the input current (referring to the waveform of realistic input current 152 shown in FIG. 5) follows (or aligns to) the reference voltage waveform 163 such that the power factor of the power converter apparatus 100 can be optimized for achieving an optimized power conversion effect.

In addition, the current feedback modulator 168 of the digital processor module 160 is coupled to the current detection module 150 and the current reference command generator 166. The current feedback modulator 168 adjusts the current reference command 165 according to the waveform of realistic input current 152 sampled by the current detection module 150.

In this embodiment, the current feedback modulator 168 of the digital processor module 160 processes the current reference command 165 and the waveform of realistic input signal 152 and accordingly generates a switch modulation signal 170.

The switch signal generator 169 is coupled to the current feedback modulator 168. The switch signal generator 169 generates the switch signal to the driving module 167 according to the switch modulation signal 170, so as to dynamically adjust the active switch unit S1 through the driving module 167.

The current feedback modulator 168 may continuously feedback to adjust the current reference command until the waveform of realistic input current 152 follows the frequency of the reference voltage waveform 163, in other words, until the power factor of the power converter apparatus 100 is optimized for achieving an optimized power conversion effect.

In the embodiment, the active switch unit S1 adopts a switch unit capable of switching at high frequency, such that the inductor unit L1 and the capacitor unit C1 are not required to be high inductance or high capacitance. Therefore, the size of the inductor unit L1 and the capacitor unit C1 can be reduced addition, the reference voltage waveform 163 (as shown in FIG. 4) generated by the digital processor module 160 is programmable, such that the optimization function of the power factor is more flexible.

The power converter apparatus 100 is not limited to include only one active switch unit S1. In the embodiment, the power converter apparatus 100 may further include another switch unit S2. The switch unit S2 is connected in series between the inductor unit L1 and the electronic load 202. The switch unit S2 can be a passive switch unit or an active switch unit. In a preferable embodiment, the switch unit S2 is a diode.

In addition, the power converter apparatus 100 has circuitry variability. The power converter apparatus 100 can be selected to serve as a traditional inductor-capacitor filter circuit (by disconnecting S1) or a power factor improvement circuit (by conducting S1), and the power converter apparatus 100 also includes a voltage-boosting function. Therefore, the power converter apparatus 100 has more applications and better usability than traditional circuits.

Figure 6:
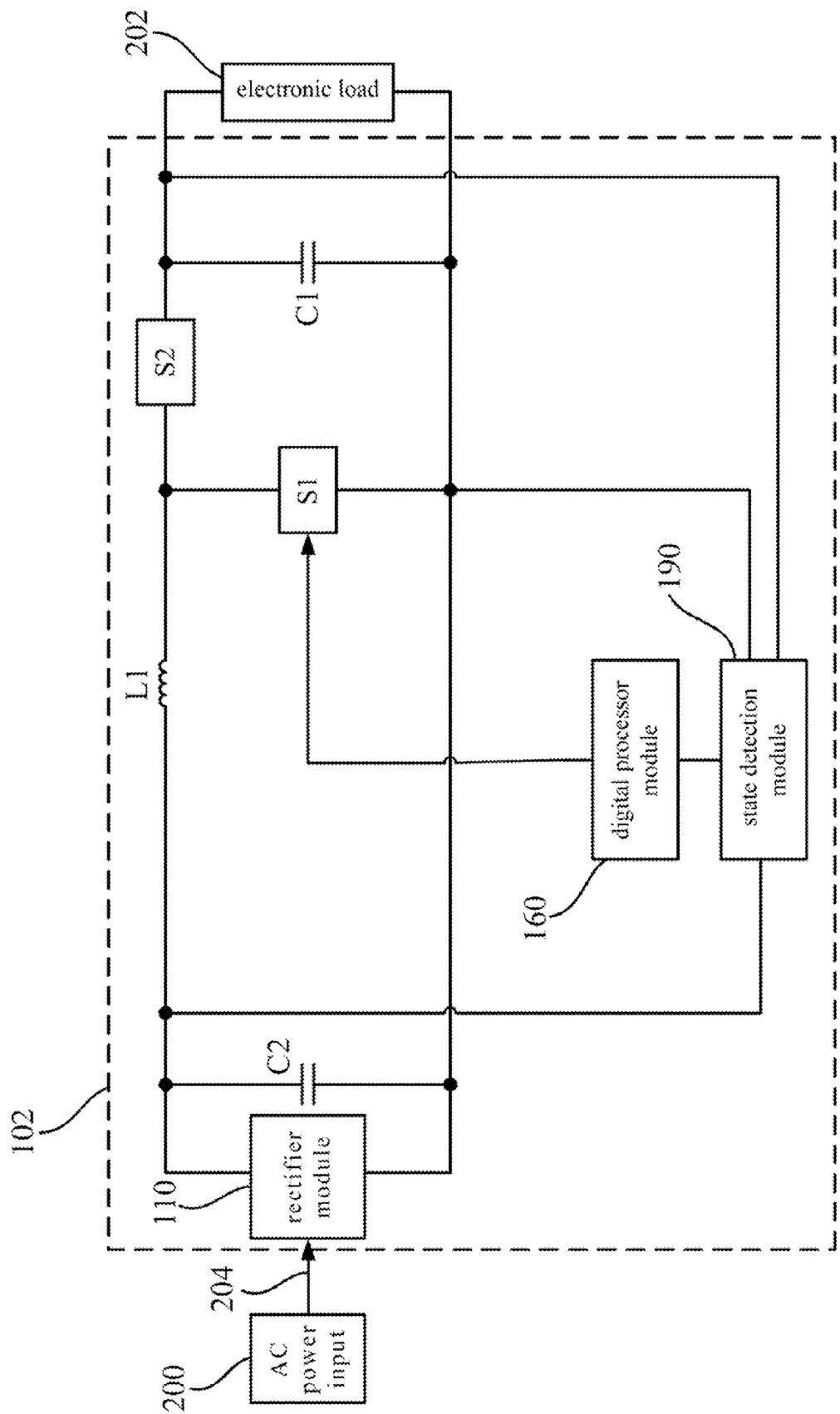
FIG. 6 is a schematic diagram illustrating a power converter apparatus according to another embodiment of the invention.
Figure 7:
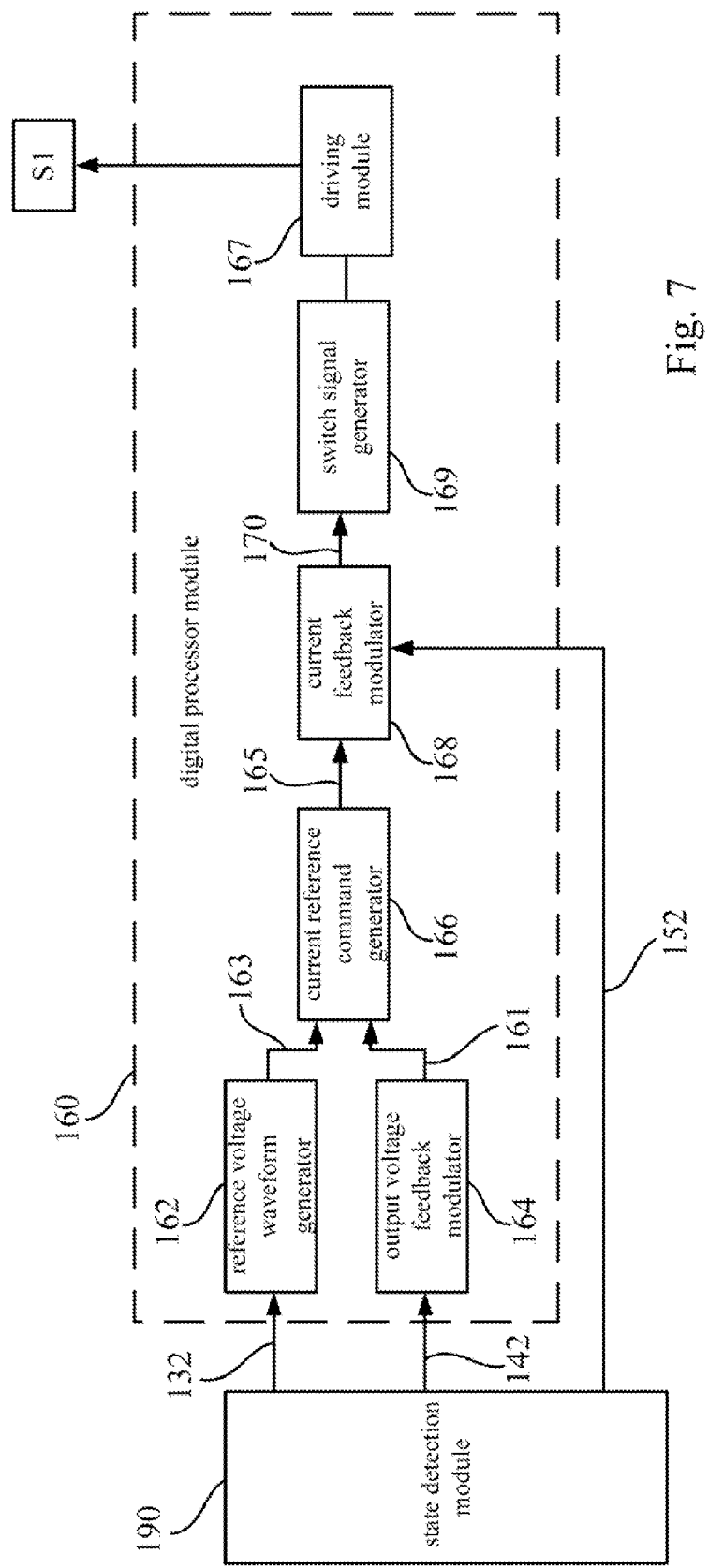
FIG. 7 is a schematic diagram illustrating a digital processor module and surrounding components according to the embodiment in FIG. 6.

In addition, the internal circuitry components of the power conversion device of this invention are not limited to the embodiment shown in FIG. 1 and FIG. 3. Reference is also made to FIG. 6 and FIG. 7. FIG. 6 is a schematic diagram illustrating a power converter apparatus 102 according to another embodiment of the invention. FIG. 7 is a schematic diagram illustrating a digital processor module 160 and surrounding components according to the embodiment in FIG. 6.

As shown in FIG. 6, the power converter apparatus 102 includes a rectifier module 110, an active switch unit S1, a state detection module 190 and a digital processor module 160. The rectifier module 110 is coupled to an alternating-current power input 200. The active switch unit S1 is coupled between the rectifier module 110 and an electronic load 202. The active switch unit S1 is shunt connected to the electronic load 202.

To be noticed that, the state detection module 190 is coupled between the rectifier module 110 and the electronic load 202 for detecting states of the power converter apparatus 102 and correspondingly generating a waveform of sampled input voltage 132, a waveform of sampled output voltage 142 and a waveform of realistic input current 152, as shown in FIG. 6 and FIG. 7.

The digital processor module 160 receives the waveform of sampled input voltage 132, the waveform of sampled output voltage 142 and the waveform of realistic input current 152.

As shown in FIG. 7, the digital processor module includes a reference voltage waveform generator 162, an output voltage feedback modulator 164, a current reference command generator 166, a driving module 167, a current feedback modulator 168 and a switch signal generator. The reference voltage waveform generator 162, the output voltage feedback modulator 164 and the current feedback modulator 168 are respectively coupled to the state detection module 190.

The reference voltage waveform generator 162 receives the waveform of sampled input voltage 132 from the state detection module 190. The output voltage feedback modulator 164 receives the waveform of sampled output voltage 142 from the state detection module 190. The current feedback modulator 168 receives the waveform of realistic input current 152 from the state detection module 190.

The digital processor module 190 generates a reference voltage waveform 163 according to the waveform of sampled input voltage 132 (also referring to FIG. 4 and FIG. 5 in aforesaid embodiments). Then the digital processor module 190 generates the current reference command 165 (also referring to FIG. 4 in aforesaid embodiments), so as to control the active switch unit S1 until the waveform of realistic input current 152 follows the reference voltage waveform 163.

Other internal components and operational behaviors of the power converter apparatus 102 and the digital processor module 160 are substantially similar to the power converter apparatus 100 in aforesaid embodiment. Reference can be made to embodiments illustrated in FIG. 1 to FIG. 5, and not to be repeated here.

As embodiments mentioned above, the disclosure provides a circuitry structure of a power converter apparatus for calibrating a power factor and improving harmonic waveform components of an input current, so as to match a modern electricity regulation. In the present invention, the input voltage waveform obtained by the input voltage detection module is transmitted to a digital processor module for frequency adjustment, so as to make sure the frequencies of the input voltage and the input current are matched. Accordingly, the power converter apparatus generates a switch signal controlling the active switch unit, so as to improve the power factor and reduce the harmonic waveform components of the power converter apparatus.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A power converter apparatus, coupled to an electronic load and configured for driving the electronic load, the power converter apparatus comprising:

a rectifier module coupled to an alternating-current power input;

an active switch unit coupled between the rectifier module and the electronic load, two terminals of the active switch unit being shunt connected to two terminals of the electronic load;

an input voltage detection module coupled between the rectifier module and the active switch unit for sampling out a sampled input voltage waveform;

an output voltage detection module coupled between the active switch unit and the electronic load for sampling out a sampled output voltage waveform;

a current detection module coupled to the active switch unit for sampling out a realistic input current waveform; and a digital processor module coupled to the input voltage detection module, the output voltage detection module, the current detection module and a controlling terminal of the active switch unit, the digital processor module generating a current reference command according to the sampled input voltage waveform and the sampled output voltage waveform, the digital processor module dynamically switching the active switch unit according to the current reference command and the practical input current waveform;

wherein the digital processor module comprises:
- a reference voltage waveform generator coupled to the input voltage detection module for processing the sampled input voltage waveform and accordingly generating a reference voltage waveform, wherein a frequency of the reference voltage waveform is lower than a frequency of the sampled input voltage waveform;
- an output voltage feedback modulator coupled to the output voltage detection module for generating a control signal according to the sampled output voltage waveform; and
- a current reference command generator coupled to the reference voltage waveform generator and the output voltage feedback module, the current reference command generator is configured for generating the current reference command according to the reference voltage waveform and the control signal.

2. The power converter apparatus of claim 1, wherein the reference voltage waveform generated by the reference voltage waveform generator determines a current pulse width of the current reference command.

3. The power converter apparatus of claim 1, wherein the control signal generated by the output voltage feedback modulator determines a current amplitude of the current reference command.

4. The power converter apparatus of claim 1, wherein the digital processor module further comprises:
- a driving module coupled to the controlling terminal of the active switch unit;
- a current feedback modulator coupled to the current detection module and the current reference command generator, the current feedback modulator adjusts the current reference command according to the realistic input current waveform sampled by the current detection module, so as to generate a switch modulation signal; and
- a switch signal generator coupled to the current feedback modulator, the switch signal generator generates a switch signal to the driving module according to the switch modulation signal, so as to switch the active switch unit.

5. The power converter apparatus of claim 4, wherein the current feedback modulator continuously adjusts the current reference command for controlling the active switch unit until the realistic input current waveform follows the reference voltage waveform.

6. The power converter apparatus of claim 1, further comprising a capacitor unit and an inductor unit, the capacitor unit being shunt connected to the electronic load, and the inductor unit being connected in series with the electronic load.

7. The power converter apparatus of claim 6, further comprising a passive switch unit connected in series between the inductor unit and the electronic load.

8. The power converter apparatus of claim 6, further comprising another active switch unit connected in series between the inductor unit and the electronic load.

9. The power converter apparatus of claim 1, wherein the alternating-current power input is a three-phased alternating-current power input.

10. The power converter apparatus of claim 1, wherein the active switch unit is a silicon carbide switch.

11. A power converter apparatus, coupled to an electronic load and configured for driving the electronic load, the power converter apparatus comprising:
- a rectifier module coupled to an alternating-current power input;
- an active switch unit coupled between the rectifier module and the electronic load, two terminals of the active switch unit being shunt connected to the electronic load;
- a state detection module coupled between the rectifier module and the electronic load for detecting states of the power converter apparatus and correspondingly generating a sampled input voltage waveform, a sampled output voltage waveform and a realistic input current waveform;
- a digital processor module, receiving the sampled input voltage waveform, the sampled output voltage waveform and the realistic input current waveform;

wherein, after the digital processor module generates a reference voltage waveform according to the sampled input voltage waveform, the digital processor module generates a current reference command so as to control the active switch unit until the realistic input current waveform follows the reference voltage waveform;

wherein the digital processor module comprises:
- a reference voltage waveform generator coupled to the state detection module for processing the sampled input voltage waveform and accordingly generating a reference voltage waveform, wherein a frequency of the reference voltage waveform is lower than a frequency of the sampled input voltage waveform;
- and output voltage feedback modulator coupled to the state detection module for generating a control signal according to the sampled output voltage waveform; and
- a current reference command generator coupled to the reference voltage waveform generator and the output voltage feedback module, the current reference command generator is configured for generating the current reference command according to the reference voltage waveform and the control signal.

12. The power converter apparatus of claim 11, wherein the reference voltage waveform generated by the reference voltage waveform generator determines a current pulse width of the current reference command.

13. The power converter apparatus of claim 11, wherein the control signal generated by the output voltage feedback modulator determines a current amplitude of the current reference command.

14. The power converter apparatus of claim 11, wherein the digital processor module further comprises:
- a driving module coupled to the controlling terminal of the active switch unit;
- a current feedback modulator coupled to the state detection module and the current reference command generator, the current feedback modulator adjusts the current reference command according to the realistic input current waveform generated by the state detection module, so as to generate a switch modulation signal; and
- a switch signal generator coupled to the current feedback modulator, the switch signal generator generates a switch signal to the driving module according to the switch modulation signal, so as to switch the active switch unit.

15. The power converter apparatus of claim 14, wherein the current feedback modulator continuously adjusts the current reference command for controlling the active switch unit until the realistic input current waveform follows the reference voltage waveform.

16. The power converter apparatus of claim 11, further comprising a capacitor unit and an inductor unit, the capacitor unit being shunt connected to the electronic load, and the inductor unit being connected in series with the electronic load.

17. The power converter apparatus of claim 16, further comprising a passive switch unit connected in series between the inductor unit and the electronic bad.

18. The power converter apparatus of claim 16, further comprising another active switch unit connected in series between the inductor unit and the electronic bad.

19. The power converter apparatus of claim 11, wherein the alternating-current power input is a three-phased alternating-current power input.

* * * * *